United States Patent
Yang et al.

(10) Patent No.: US 9,954,451 B2
(45) Date of Patent: Apr. 24, 2018

(54) PROGRAMMABLE FREQUENCY DECREASE CIRCUIT FOR A PROGRAMMABLE POWER SUPPLY

(71) Applicant: SEMICONDUCTOR COMPONENTS INDUSTRIES, LLC, Phoenix, AZ (US)

(72) Inventors: Ta-Yung Yang, Milpitas, CA (US); Chen-Hua Chiu, New Taipei (TW); Yong-Ann Ang, Sarawak (MY); Jhih-Da Hsu, New Taipei (TW)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 424 days.

(21) Appl. No.: 14/525,319

(22) Filed: Oct. 28, 2014

(65) Prior Publication Data

US 2015/0115921 A1 Apr. 30, 2015

Related U.S. Application Data

(60) Provisional application No. 61/896,234, filed on Oct. 28, 2013.

(51) Int. Cl.
*G05F 1/30* (2006.01)
*H02M 3/335* (2006.01)
*H02M 1/00* (2006.01)

(52) U.S. Cl.
CPC ........... *H02M 3/33523* (2013.01); *H02M 2001/0025* (2013.01)

(58) Field of Classification Search
CPC ............................ G05F 1/30; H02M 3/33523

USPC .......................................... 323/282–289, 315
See application file for complete search history.

(56) References Cited

U.S. PATENT DOCUMENTS

| 5,898,329 | A | 4/1999 | Hopkins | |
|---|---|---|---|---|
| 5,943,227 | A * | 8/1999 | Bryson | H02M 3/156 323/283 |
| 6,310,953 | B1 * | 10/2001 | Yoshida | H04M 3/005 379/395.01 |
| 6,545,882 | B2 | 4/2003 | Yang | |
| 6,597,159 | B2 | 7/2003 | Yang | |
| 7,109,694 | B2 * | 9/2006 | Mihalka | H02J 1/102 323/283 |

(Continued)

FOREIGN PATENT DOCUMENTS

CN 104022656 A 9/2014

*Primary Examiner* — Adolf Berhane
*Assistant Examiner* — Nusrat Quddus
(74) *Attorney, Agent, or Firm* — Robert F. Hightower

(57) ABSTRACT

A control circuit and a method for a programmable power supply are provided. The control circuit and the method modulate a switching frequency of a switching signal in response to a feedback signal and an output voltage of the programmable power supply. The switching signal is used for switching a transformer and regulating an output of the programmable power supply. The level of the feedback signal is related to the level of an output power of the programmable power supply. The output voltage of the programmable power supply is programmable. Further, the control circuit and the method modulate a maximum switching frequency of the switching signal in response to the output voltage of the programmable power supply for stabilizing the system.

28 Claims, 19 Drawing Sheets

(56) References Cited

U.S. PATENT DOCUMENTS

| | | |
|---|---|---|
| 7,349,229 B1 | 3/2008 | Yang |
| 7,486,528 B2 | 2/2009 | Yang |
| 7,671,578 B2 | 3/2010 | Li et al. |
| 7,936,638 B2* | 5/2011 | Chan ........................ G11C 8/18 365/154 |
| 2003/0034764 A1 | 2/2003 | Yang |
| 2007/0108947 A1* | 5/2007 | Liao ...................... H02M 3/156 323/222 |
| 2011/0006744 A1* | 1/2011 | Dearborn .............. H02M 3/156 323/282 |

\* cited by examiner

US 9,954,451 B2

PROGRAMMABLE FREQUENCY DECREASE CIRCUIT FOR A PROGRAMMABLE POWER SUPPLY

BACKGROUND OF THE INVENTION

Field of Invention

The present invention relates to a programmable power supply, and more specifically relates to a control circuit and a method for controlling the programmable power supply.

Description of the Related Art

The programmable power supply provides the output voltage which is programmable, such as 5V~20V. The present invention provides a programmable frequency modulation function for a power supply with the programmable output voltage. The frequency modulation function is developed for saving the power during the light load operation. The detail skill of the frequency modulation function for the power supply can be found in the prior arts of "PWM controller having off-time modulation for power converter", U.S. Pat. No. 6,545,882; "pulse width modulation controller having frequency modulation for power converter", U.S. Pat. No. 6,597,159.

BRIEF SUMMARY OF THE INVENTION

The objective of the present invention is to provide a control circuit and a method for modulating the switching frequency of the switching signal of the programmable power supply.

The objective of the present invention is to provide a control circuit and a method for modulating the maximum switching frequency of the switching signal of the programmable power supply in response to the output voltage.

A control circuit of a programmable power supply according to the present invention comprises a modulation circuit. The modulation circuit modulates a switching frequency of a switching signal in response to a feedback signal and an output voltage of the programmable power supply. The switching signal is used for switching a transformer and regulating an output of the programmable power supply. The level of the feedback signal is related to the level of an output power of the programmable power supply. The output voltage of the programmable power supply is programmable.

A method of modulating a switching frequency for a programmable power supply according to the present invention comprises modulating a switching frequency of a switching signal in response to a feedback signal and an output voltage of the programmable power supply. The switching signal is used for switching a transformer and regulating an output of the programmable power supply. The level of the feedback signal is related to the level of an output power of the programmable power supply. The output voltage of the programmable power supply is programmable.

A control circuit of a programmable power supply according to the present invention comprises a modulation circuit. The modulation circuit modulates a maximum switching frequency of a switching signal in response to an output voltage of the programmable power supply. The switching signal is used for switching a transformer and regulating an output of the programmable power supply. The output voltage of the programmable power supply is programmable.

A method of modulating a maximum switching frequency for a programmable power supply according to the present invention comprises modulating a maximum switching frequency of a switching signal in response to an output voltage of the programmable power supply. The switching signal is used for switching a transformer and regulating an output of the programmable power supply. The output voltage of the programmable power supply is programmable.

BRIEF DESCRIPTION OF THE DRAWINGS

The accompanying drawings are included to provide further understanding of the invention, and are incorporated into and constitute a part of this specification. The drawings illustrate embodiments of the invention and, together with the description, serve to explain the principles of the invention.

DETAILED DESCRIPTION OF EMBODIMENTS

Figure 1:
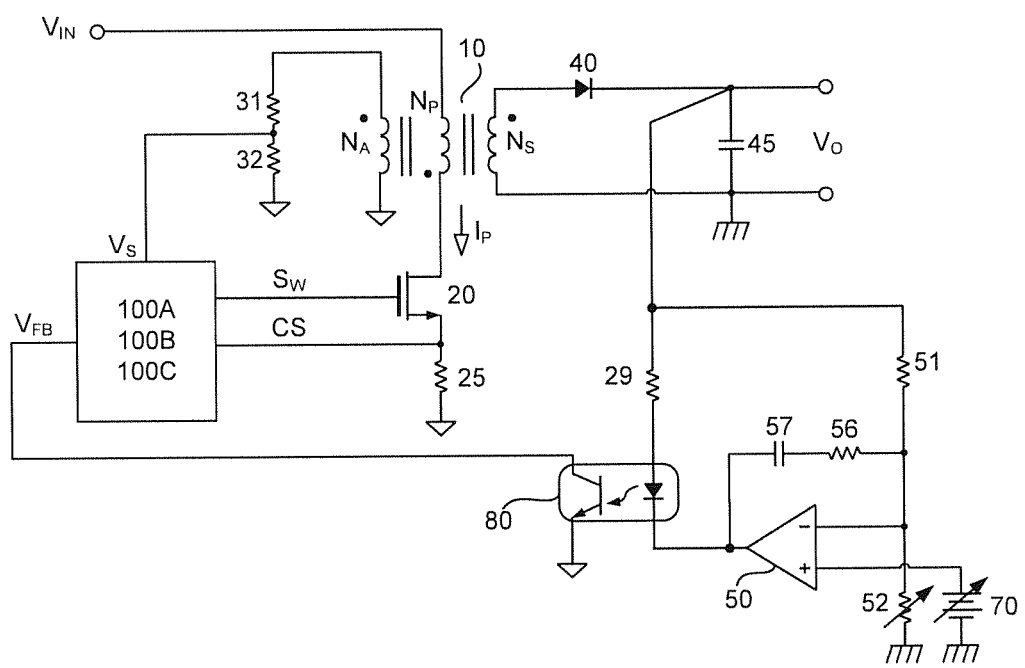
FIG. 1 is a circuit diagram of an embodiment of a programmable power supply in accordance with the present invention.

FIG. 1 is a circuit diagram of an embodiment of a programmable power supply in accordance with the present invention. As shown in FIG. 1, a transformer 10 includes a primary winding $N_P$, a secondary winding $N_S$, and an auxiliary winding $N_A$. The primary winding $N_P$ of the transformer 10 is connected between an input voltage $V_{IN}$ of the power supply and a transistor 20. The transistor 20 is coupled to switch the transformer 10 for transforming a power. The power is related to the input voltage $V_{IN}$. Once the transformer 10 is switched, the power is transformed from the primary winding $N_P$ to the secondary winding $N_S$, and an output voltage $V_O$ of the power supply is generated. A rectifier 40 and a capacitor 45 are coupled to the secondary winding $N_S$. In other words, the secondary winding $N_S$ of the transformer 10 will generate the output voltage $V_O$ through the rectifier 40 and the capacitor 45 when the transformer 10 is switched.

Figure 2:
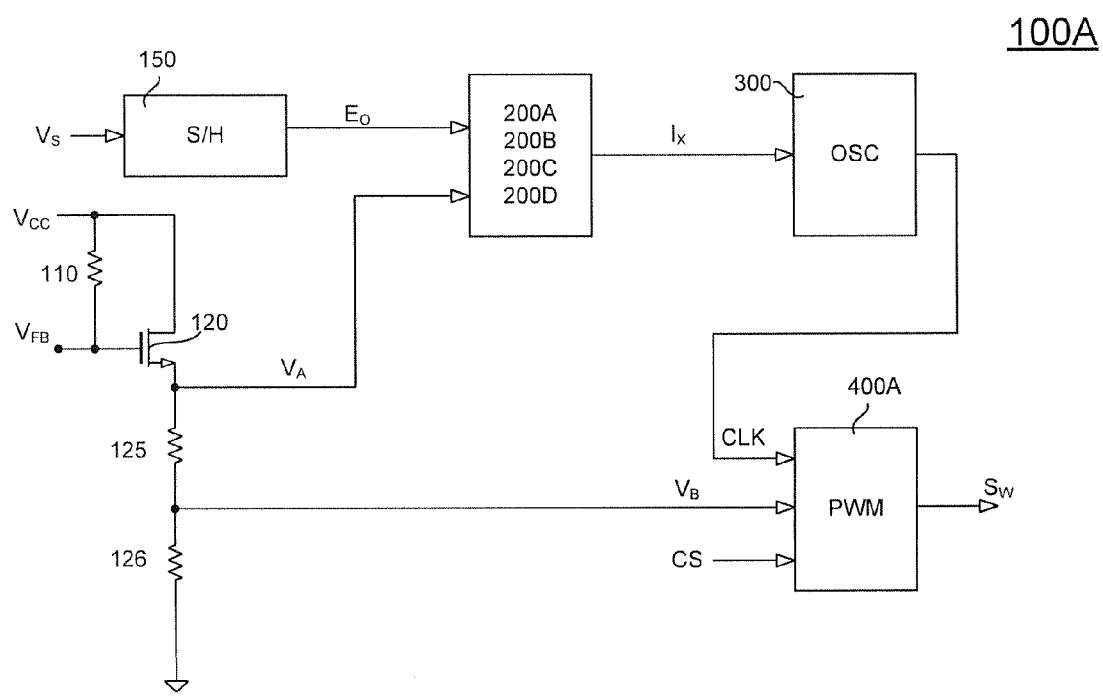
FIG. 2 is a circuit diagram of a first embodiment of the control circuit in accordance with the present invention.

A control circuit 100A, 100B, or 100C generates a switching signal $S_W$ coupled to drive the transistor 20 to switch the transformer 10 for regulating the output voltage $V_O$ of the power supply. When the transistor 20 is turned on, a transformer current $I_P$ will be utilized to generate a switching current signal CS via a resistor 25. The resistor 25 is coupled between the transistor 20 and a ground. The switching current signal CS is coupled to the control circuit 100A, 100B, or 100C. Resistors 31 and 32 are coupled between the auxiliary winding $N_A$ of the transformer 10 and the ground for detecting a reflected signal $V_S$. The reflected signal $V_S$ is coupled to the control circuit 100A, 100B, or 100C. The reflected signal $V_S$ represents a reflected voltage of the transformer 10. The level of the reflected signal $V_S$ is related to the level of the output voltage $V_O$ during the demagnetizing period of the transformer 10. Therefore, an output-voltage signal $E_O$ (as shown in FIG. 2) is produced according to the reflected signal $V_S$. In other words, the output-voltage signal $E_O$ is correlated to the level of the output voltage $V_O$ of the power supply.

A negative input terminal of an error amplifier 50 is coupled to receive the output voltage $V_O$ via a voltage divider. The voltage divider includes resistors 51 and 52. The error amplifier 50 has a reference voltage 70 ($V_R$) coupled to a positive input terminal of the error amplifier 50. An output terminal of the error amplifier 50 generates a feedback signal $V_{FB}$ coupled to the control circuit 100A, 100B, or 100C through an opto-coupler 80. The level of the feedback signal $V_{FB}$ is proportional to the level of the output power, the output current, and the transformer current $I_P$ of the power supply. Therefore, the control circuit 100A, 100B, or 100C will generate the switching signal $S_W$ according to the feedback signal $V_{FB}$ to regulate the output voltage $V_O$ as shown in the equation (1).

$$V_O = \frac{R_{51} + R_{52}}{R_{52}} \times V_R \quad (1)$$

The reference voltage 70 ($V_R$) is programmable for determining the output voltage $V_O$ of the power supply. Furthermore, the resistor 52 is adjustable for programming the output voltage $V_O$. The reference voltage 70 and the resistor 52 are adjusted by a command from system or other external device according to an embodiment of the present invention. A resistor 56 and a capacitor 57 are connected between the negative input terminal and the output terminal of the error amplifier 50 for the feedback loop compensation. The capacitance of the capacitor 57 will determine the bandwidth of the feedback loop for the regulation of the output voltage $V_O$. Further, the opto-coupler 80 is coupled to the output voltage $V_O$ via a resistor 29.

FIG. 2 is a circuit diagram of an embodiment of the control circuit 100A in accordance with the present invention. As shown in FIG. 2, a level-shift circuit includes a transistor 120 and resistors 110, 125, 126. The level-shift circuit is coupled to receive the feedback signal $V_{FB}$ for generating feedback signals $V_A$ and $V_B$. The drain of the transistor 120 is coupled to a supply voltage $V_{CC}$. A first terminal of the resistor 110 is coupled to the supply voltage $V_{CC}$ and the drain of the transistor 120. A second terminal of the resistor 110 is coupled to the gate of the transistor 120 and the feedback signal $V_{FB}$. The gate of the transistor 120 is further coupled to receive the feedback signal $V_{FB}$. The source of the transistor 120 is coupled to a first terminal of the resistor 125. The resistor 126 is coupled between a second terminal of the resistor 125 and the ground. The feedback signal $V_A$ is generated at the joint of the transistor 120 and the resistor 125. The feedback signal $V_B$ is generated at the joint of the resistors 125 and 126. In other words, the level of the feedback signals $V_A$ and $V_B$ are related to the level of the feedback signal $V_{FB}$.

The feedback signal $V_B$, the switching current signal CS and a clock signal CLK are connected to a PWM circuit (PWM) 400A for generating the switching signal $S_W$. The switching frequency of the switching signal $S_W$ is determined by the frequency of the clock signal CLK. A modulation circuit comprises a generation circuit 200A, 200B, 200C, or 200D and a oscillator (OSC) 300. The clock signal CLK is generated by the oscillator 300 according to a control signal $I_X$. The control signal $I_X$ is coupled to the oscillator 300 to control the frequency of the clock signal CLK. The maximum frequency of the clock signal CLK is determined by the maximum value of the control signal $I_X$.

The generation circuit 200A, 200B, 200C, or 200D generates the control signal $I_X$ in accordance with the feedback signal $V_A$ and the output-voltage signal $E_O$. The output-voltage signal $E_O$ is correlated to the output voltage $V_O$ (as shown in FIG. 1). In other words, the generation circuit 200A, 200B, 200C, or 200D generates the control signal $I_X$ in response to the feedback signal $V_{FB}$ (as shown in FIG. 1) and the output voltage $V_O$. According to above, the modulation circuit modulates the switching frequency of the switching signal $S_W$ in response to the feedback signal $V_{FB}$ and the output voltage $V_O$ of the power supply.

A sample-hold circuit (S/H) 150 receives the reflected signal $V_S$ for generating the output-voltage signal $E_O$. The detailed skill of sampling the reflected voltage of the transformer 10 (as shown in FIG. 1) and generating the output-voltage signal $E_O$ can be found in the prior arts "Causal sampling circuit for measuring reflected voltage and demagnetizing time of transformer", U.S. Pat. No. 7,349,229; "Linear-predict sampling for measuring demagnetized voltage of transform", U.S. Pat. No. 7,486,528.

Figure 3A:
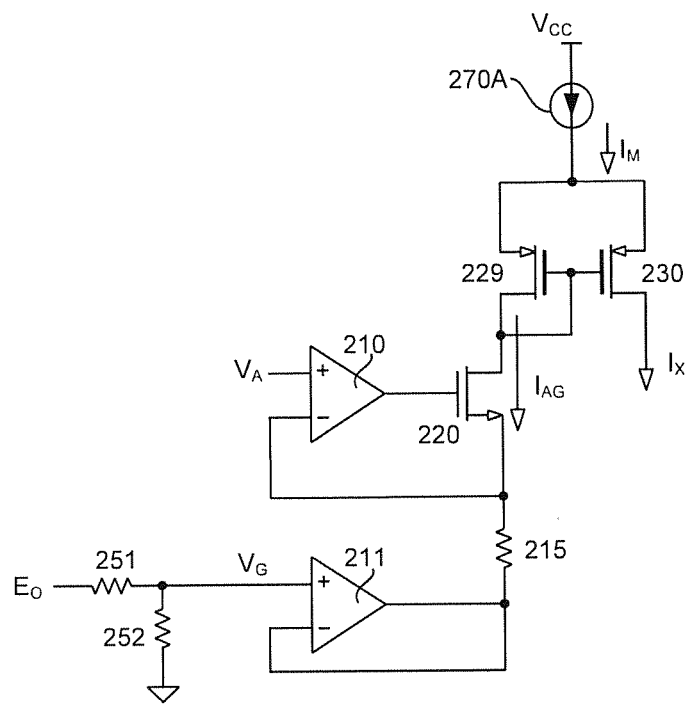
FIG. 3A is a circuit diagram of a first embodiment of the generation circuit in accordance with the present invention.

FIG. 3A is a circuit diagram of an embodiment of the generation circuit 200A in accordance with the present invention. The output-voltage signal $E_O$ is utilized to generate a signal $V_G$ through a voltage divider. The voltage divider is formed by resistors 251 and 252. Therefore, the level of the signal $V_G$ is correlated to the level of the output-voltage signal $E_O$. That is, the level of the signal $V_G$ is correlated to the level of the output voltage $V_O$ of the power supply (as shown in FIG. 1). The signal $V_G$ is shown as, $$V_G = \frac{R_{252}}{R_{251} + R_{252}} \times E_O \qquad (2)$$

Amplifiers 210, 211 and a resistor 215 will generate a current $I_{AG}$ according to the feedback signal $V_A$ and the signal $V_G$. The current $I_{AG}$ is shown as, $$I_{AG} = \frac{V_A - V_G}{R_{215}} \qquad (3)$$

The control signal $I_X$ is generated according to the current $I_{AG}$ through a current mirror. The control signal $I_X$ is shown as, $$I_X = K \times I_{AG} \qquad (4)$$

wherein the constant K is related to the ratio of the current mirror formed by transistors 229 and 230.

According to the equations (3) and (4), the feedback signal $V_A$ is compared with the signal $V_G$ for generating the control signal $I_X$. That is, the control signal $I_X$ is generated according to the comparison between the feedback signal $V_{FB}$ and the output voltage $V_O$ of the power supply. The control signal $I_X$ is utilized to control the frequency of the clock signal CLK for modulating the switching frequency of the switching signal $S_W$ (as shown in FIG. 1). That is, the switching frequency of the switching signal $S_W$ is modulated according to the comparison between the feedback signal $V_{FB}$ and the output voltage $V_O$. The maximum value of the control signal $I_X$ is clamped by a current $I_M$ of a current source 270A. Therefore, the value of the control signal $I_X$ is determined by the feedback signal $V_A$ and the output-voltage signal $E_O$.

A positive input terminal of the amplifier 211 is coupled to the voltage divider to receive the signal $V_G$. A negative input terminal of the amplifier 211 is coupled to an output terminal of the amplifier 211 and a second terminal of the resistor 215. A positive input terminal of the amplifier 210 is coupled to receive the feedback signal $V_A$. A negative input terminal of the amplifier 210 is coupled to the source of the transistor 220. The gate of the transistor 220 is coupled to an output terminal of the amplifier 210. A first terminal of the resistor 215 is coupled to the negative input terminal of the amplifier 210 and the source of the transistor 220. The drain of the transistor 220 generates the current $I_{AG}$.

The drain of the transistor 229 is coupled to the drain of the transistor 220 to receive the current $I_{AG}$. The gates of the transistors 229 and 230 are coupled each other and they all are coupled to the drains of the transistors 229 and 220. The sources of transistors 229 and 230 are coupled to the current source 270A. The control signal $I_X$ is generated at the drain of the transistor 230 in response to the current $I_{AG}$. The current source 270A is coupled to the supply voltage $V_{CC}$.

Figure 3B:
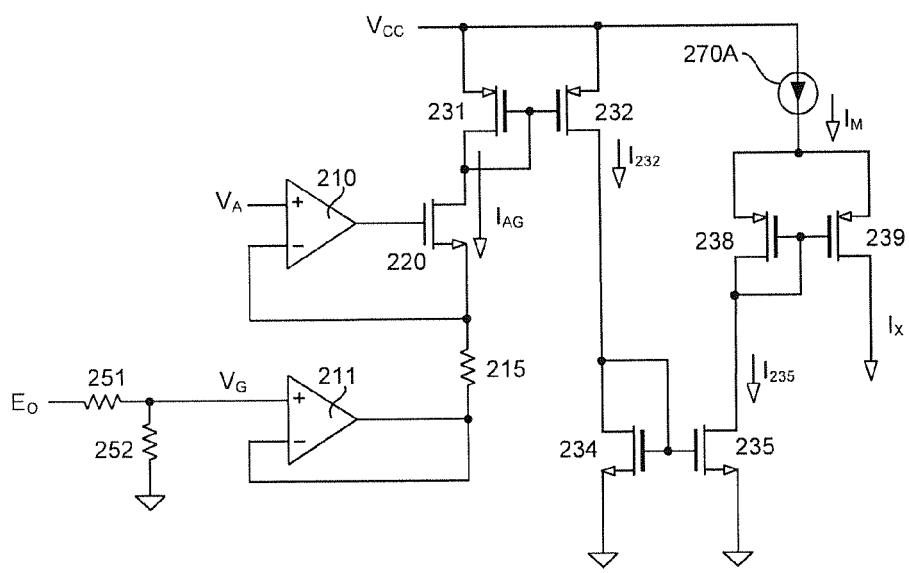
FIG. 3B is a circuit diagram of a second embodiment of the generation circuit in accordance with the present invention.

FIG. 3B is a circuit diagram of an embodiment of the generation circuit 200B in accordance with the present invention. The difference between the generation circuit 200B shown in FIG. 3B and the generation circuit 200A shown in FIG. 3A is that the generation circuit 200B comprises a plurality of current mirrors. The current mirrors include transistors 231, 232, 234, 235, 238, and 239. The drain of the transistor 231 is coupled to the drain of the transistor 220 to receive the current $I_{AG}$. The gates of the transistors 231 and 232 are coupled each other and they all are coupled to the drains of the transistors 231 and 220. The sources of transistors 231 and 232 are coupled to the supply voltage $V_{CC}$. The drain of the transistor 232 generates a current $I_{232}$. The drain of the transistor 234 is coupled to the drain of the transistor 232 to receive the current $I_{232}$. The gates of the transistors 234 and 235 are coupled each other and they all are coupled to the drains of the transistors 232 and 234. The sources of the transistors 234 and 235 are coupled to the ground. The drain of the transistor 235 generates a current $I_{235}$.

The drain of the transistor 238 is coupled to the drain of the transistor 235 to receive the current $I_{235}$. The gates of the transistors 238 and 239 are coupled each other and they all are coupled to the drains of the transistors 238 and 235. The sources of the transistors 238 and 239 are coupled to the current source 270A. The control signal $I_X$ is generated at the drain of the transistor 239 in response to the current $I_{235}$. The current source 270A is coupled to the supply voltage $V_{CC}$. In this embodiment, the control signal $I_X$ is generated according to the current $I_{AG}$ through the current mirrors, the control signal $I_X$ is shown as equation (4), the constant K is related to the ratio of the current mirrors formed by the transistors 231, 232, 234, 235, 238, and 239.

Figure 4:
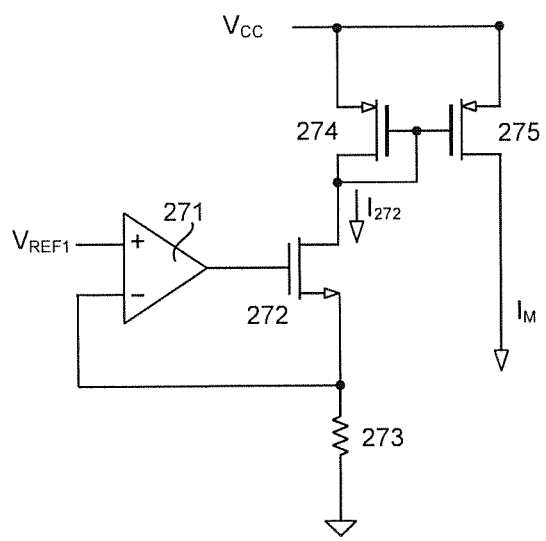
FIG. 4 is a circuit diagram of a first embodiment of the current source in accordance with the present invention.

FIG. 4 is a circuit diagram of an embodiment of the current source 270A in accordance with the present invention. As shown in FIG. 4, the current source 270A comprises an amplifier 271, a transistor 272, a resistor 273, and a current mirror including transistors 274 and 275. A positive input terminal of the amplifier 271 is coupled to receive a reference signal $V_{REF1}$. A negative input terminal of the amplifier 271 is coupled to the source of the transistor 272. The gate of the transistor 272 is coupled to an output terminal of the amplifier 271. The resistor 273 is coupled between the negative input terminal of the amplifier 271 and the ground. A current $I_{272}$ is generated at the drain of the transistor 272. The level of the current $I_{277}$ is that the level of the reference signal $V_{REF1}$ is divided by the resistance of the resistor 273.

The drain of the transistor 274 is coupled to the drain of the transistor 272 to receive the current $I_{272}$. The gates of the transistors 274 and 275 are coupled each other and they all are coupled to the drains of the transistors 274 and 272. The sources of the transistors 274 and 275 are coupled to the supply voltage $V_{CC}$. The current $I_M$ is generated at the drain of the transistor 275 in response to the current $I_{272}$. In other words, the current mirror receives the current $I_{272}$ and mirrors the current $I_{272}$ to generate the current $I_M$. Therefore, the level of the current $I_M$ is determined by the reference signal $V_{REF1}$. In this embodiment, the reference signal $V_{REF1}$ is constant, and therefore the level of the current $I_M$ is also constant.

Figure 5:
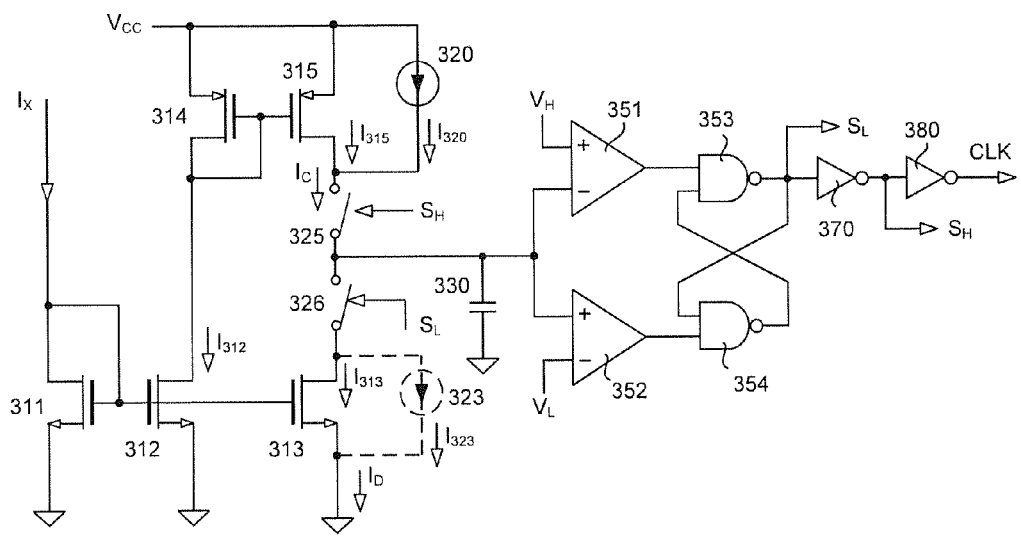
FIG. 5 is a circuit diagram of an embodiment of the oscillator in accordance with the present invention.

FIG. 5 is a circuit diagram of an embodiment of the oscillator 300 in accordance with the present invention. Transistors 311, 312, 313, 314 and 315 develop a plurality of current mirrors coupled to receive the control signal $I_X$ for generating a charge current $I_C$ and a discharge current $I_D$. The charge current $I_C$ also includes a minimum current determined by a current $I_{320}$ generated by a current source 320. The discharge current $I_D$ also includes a minimum current determined by a current $I_{323}$ generated by a current source 323. The charge current $I_C$ and the discharge current $I_D$ are coupled to charge and discharge a capacitor 330 through switches 325 and 326 respectively. The switch 325 is controlled by a signal $S_H$. A signal $S_L$ controls the switch 326. Comparators 351 and 352 are coupled to compare the voltage of the capacitor 330 with trip-point thresholds $V_H$ and $V_L$. NAND gates 353, 354 and inverters 370, 380 develop a latch circuit connected to the outputs of the comparators 351 and 352 for generating the signals $S_H$, $S_L$ and the clock signal CLK.

The frequency of the clock signal CLK is determined by the capacitance of the capacitor 330 and the value of the control signal $I_X$. Therefore, the frequency of the clock signal will be determined by the output voltage $V_O$ (as shown in FIG. 1) and the feedback signal $V_{FB}$ (as shown in FIG. 1). The level of the feedback signal $V_{FB}$ is proportional to the level of the output power of the power supply.

The drain of the transistor 311 is coupled to receive the control signal $I_X$. The gates of the transistors 311 and 312 are coupled each other and they all are coupled to the drain of the transistor 311. The sources of the transistors 311 and 312 are coupled to the ground. The drain of the transistor 312 generates a current $I_{312}$. The gates of the transistors 311 and 313 are coupled each other and they all are coupled to the drain of the transistor 311. The source of the transistor 313 is also coupled to the ground. The drain of the transistor 313 generates a current $I_{313}$. The current source 323 is coupled to the transistor 313 in parallel. The current $I_{313}$ and the current $I_{323}$ are utilized to generate the discharge current $I_D$. The value of the discharge current $I_D$ is the sum of the current $I_{313}$ and the current $I_{323}$.

The drain of the transistor 314 is coupled to the drain of the transistor 312 to receive the current $I_{312}$. The gates of the transistors 314 and 315 are coupled each other and they all are coupled to the drains of the transistors 314 and 312. The sources of the transistors 314 and 315 are coupled to the supply voltage $V_{CC}$. The drain of the transistor 315 generates a current $I_{315}$. The current source 320 is coupled to the transistor 315 in parallel. The current $I_{315}$ and the current $I_{320}$ are utilized to generate the charge current $I_C$. The value of the charge current $I_C$ is the sum of the current $I_{315}$ and the current $I_{320}$. The charge current $I_C$ is coupled to a first terminal of the switch 325. The capacitor 330 is coupled between a second terminal of the switch 325 and the ground. A first terminal of the switch 326 is coupled to the capacitor 330. The discharge current $I_D$ is coupled between the ground and a second terminal of the switch 326.

The capacitor 330 is coupled to the comparators 351 and 352. The voltage of the capacitor 330 is coupled to a negative input terminal of the comparator 351. The voltage of the capacitor 330 is further coupled to a positive input terminal of the comparator 352. A positive input terminal of the comparator 351 is coupled to the trip-point threshold $V_H$ to compare with the voltage of the capacitor 330. A negative input terminal of the comparator 352 is coupled to the trip-point threshold $V_L$ to compare with the voltage of the capacitor 330.

A first input terminal of the NAND gate 353 is coupled to an output terminal of the comparator 351. A first input terminal of the NAND gate 354 is coupled to an output terminal of the comparator 352. A second input terminal of the NAND gate 353 is coupled to an output terminal of the NAND gate 354. An output terminal of the NAND gate 353 is coupled to a second input terminal of the NAND gate 354. The output terminal of the NAND gate 353 generates the signal $S_L$ to control the switch 326. An input terminal of the inverter 370 is coupled to the output terminal of the NAND gate 353 to receive the signal $S_L$ for generating the signal $S_H$ at an output terminal of the inverter 370. The signal $S_H$ is further coupled to an input terminal of the inverter 380 for generating the clock signal CLK at an output terminal of the inverter 380.

Figure 6:
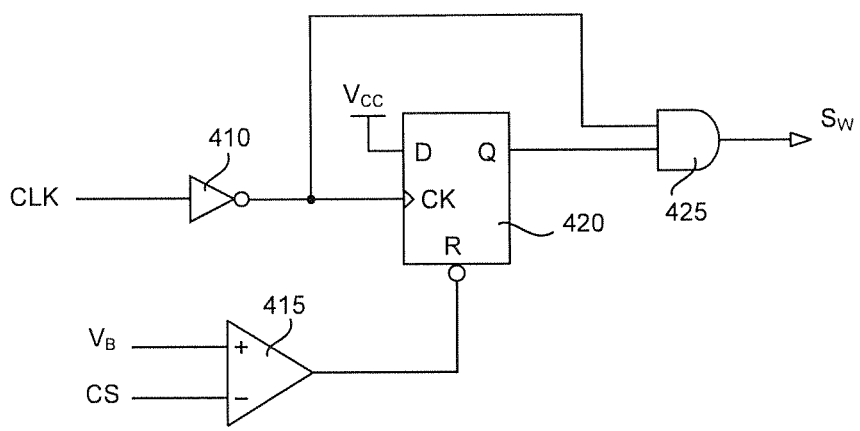
FIG. 6 is a first reference circuit diagram of the PWM circuit in accordance with the present invention.

FIG. 6 is a reference circuit diagram of the PWM circuit 400A in accordance with the present invention. As shown in FIG. 6, the PWM circuit 400A comprises an inverter 410, a comparator 415, a flip-flop 420, and an AND gate 425. An input terminal D of the flip-flop 420 is coupled to the supply voltage $V_{CC}$. A clock input terminal CK of the flip-flop 420 is coupled to receive the clock signal CLK through the inverter 410. An output terminal Q of the flip-flop 420 is coupled to a first input terminal of the AND gate 425. A second input terminal of the AND gate 425 is coupled to receive the clock signal CLK through the inverter 410. An output terminal of the AND gate 425 generates the switching signal $S_W$ to control the transistor 20 (as shown in FIG. 1). The clock signal CLK is coupled to clock the flip-flop 420 for generating the switching signal $S_W$. The switching frequency of the switching signal $S_W$ is determined by the frequency of the clock signal CLK.

A positive input terminal of the comparator 415 is coupled to receive the feedback signal $V_B$. A negative input terminal of the comparator 415 is coupled to receive the switching current signal CS. An output terminal of the comparator 415 is coupled to a reset input terminal R of the flip-flop 420. The comparator 415 will reset the flip-flop 420 when the feedback signal $V_B$ is lower than the switching current signal CS.

Figure 7:
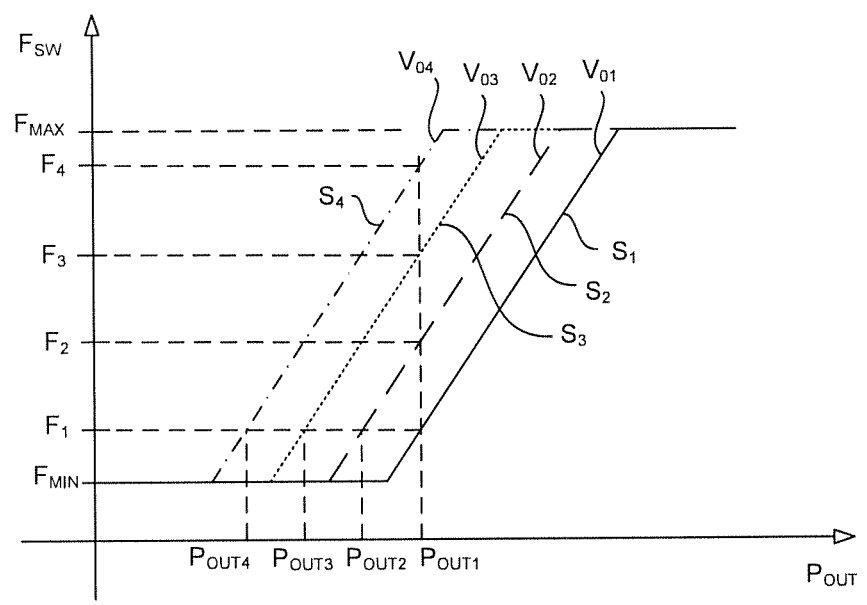
FIG. 7 shows curve of the switching frequency ($F_{SW}$) of the switching signal versus the output power ($P_{OUT}$) of the power supply.

FIG. 7 shows curve of the switching frequency ($F_{SW}$) of the switching signal $S_W$ versus the output power ($P_{OUT}$) of the power supply. The curves $S_1$, $S_2$, $S_3$, and $S_4$ show the switching frequency of the switching signal $S_W$ (as shown in FIG. 1) versus the output power of the power supply according to different output voltage $V_O$ of the power supply. For example, curve $S_1$ shows the switching frequency of the switching signal $S_W$ versus the output power of the power supply at output voltage $V_O$ of the power supply is the voltage $V_{O1}$.

Voltages $V_{O1}$, $V_{O2}$, $V_{O3}$, and $V_{O4}$ represent the level of the output voltage $V_O$ of the power supply (as shown in FIG. 1), wherein $V_{O1}$>$V_{O2}$>$V_{O3}$>$V_{O4}$, such as 20V>15V>10V>5V. As shown in FIG. 7, when the level of the output voltage $V_O$ is higher (e.g. 15V), the modulation circuit of the control circuit 100A (as shown in FIG. 1) will start to decrease the switching frequency of the switching signal $S_W$ at a higher level of the output power (e.g. 5 W). If the level of the output voltage $V_O$ is lower (e.g. 5V), then the modulation circuit of the control circuit 100A will start to decrease the switching frequency of the switching signal $S_W$ at a lower level of the output power (e.g. 2 W) when the output power is reduced. In other words, the switching frequency of the switching signal $S_W$ is decreased in response to the decrease of the output power of the power supply for power saving.

Further, the modulation circuit of the control circuit 100A will increase the switching frequency of the switching signal $S_W$ when the output voltage $V_O$ is decreased and the output power of the power supply is maintained. For example, when the output power of the power supply is maintained to be $P_{OUT1}$, and the output voltage $V_O$ is decreased from $V_{O1}$ to $V_{O2}$, the switching frequency of the switching signal $S_W$ is modulated from $F_1$ to $F_2$. In other words, when the output voltage $V_O$ is increased and the output power of the power supply is maintained, the witching frequency of the switching signal $S_W$ is decreased.

Besides, the output power is decreased when the output voltage $V_O$ is decreased, and the control circuit 100A maintains the switching frequency of the switching signal $S_W$. For example, when the output voltage $V_O$ is decreased from $V_{O1}$ to $V_{O2}$, and the switching frequency of the switching signal $S_W$ is maintained to be $F_1$, the output power of the power supply is decreased from $P_{OUT1}$ to $P_{OUT2}$.

As shown in FIG. 7, the maximum switching frequency $F_{MAX}$ and the minimum switching frequency $F_{MIN}$ a re constant. The maximum switching frequency $F_{MAX}$ is determined by the current $I_M$ (as shown in FIG. 3A or FIG. 3B). The minimum switching frequency $F_{MIN}$ is determined by the current $I_{320}$ and the current $I_{323}$ (as shown in FIG. 5). According to another embodiment of the oscillator 300, the oscillator 300 doesn't have the current source 323 (as shown in FIG. 5) and the minimum switching frequency $F_{MIN}$ may be equal to zero.

Figure 8:
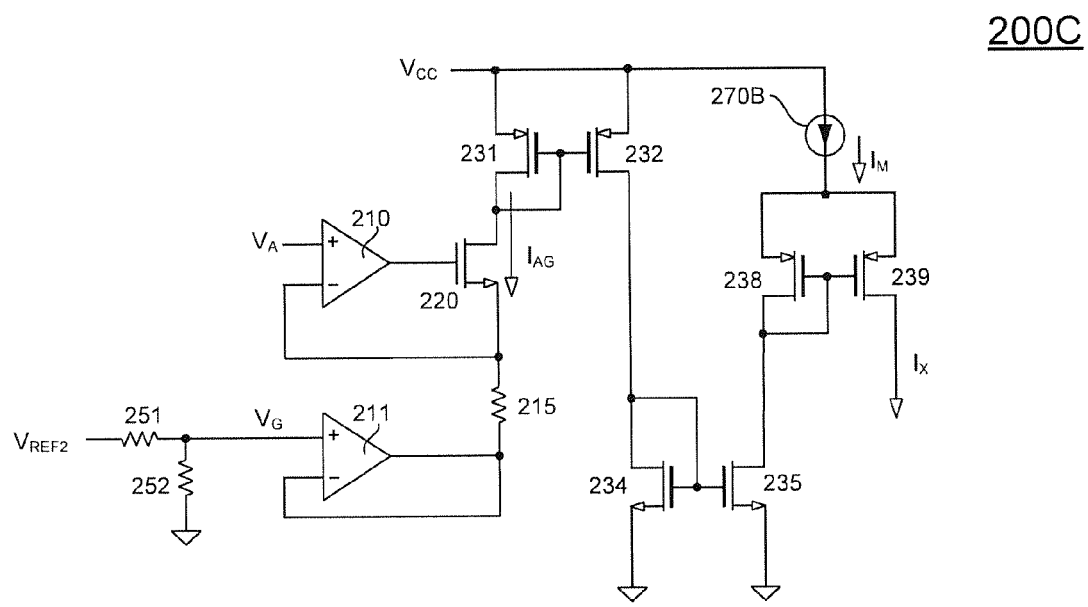
FIG. 8 is a circuit diagram of a third embodiment of the generation circuit in accordance with the present invention.
Figure 9:
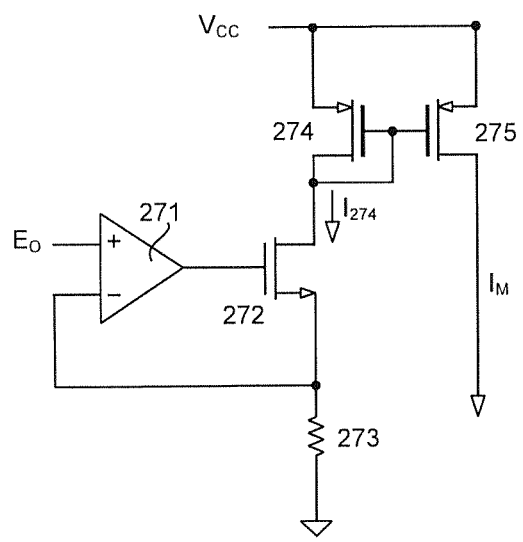
FIG. 9 is a circuit diagram of a second embodiment of the current source in accordance with the present invention.

FIG. 8 is a circuit diagram of an embodiment of the generation circuit 200C in accordance with the present invention. The difference between the generation circuit 200C shown in FIG. 8 and the generation circuit 200B shown in FIG. 3B is that the voltage divider (resistors 251 and 252) of the generation circuit 200C is coupled to receive a reference signal $V_{REF2}$ to generate the signal $V_G$. The reference signal $V_{REF2}$ is constant. Further, a current source 270B replaces the current source 270A shown in FIG. 3B. The current source 270B provides the current $I_M$ according to the output-voltage signal $E_O$ (as shown in FIG. 9). Other circuits of the generation circuit 200C are the same as the generation circuit 200B shown in FIG. 3B, so it is not described again.

Because the maximum value of the control signal $I_X$ is clamped by the current $I_M$, and the current $I_M$ is modulated according to the output-voltage signal $E_O$ (output voltage $V_O$), the generation circuit 200C modulates the maximum value of the control signal $I_X$ in response to the output voltage $V_O$ for modulating the maximum switching frequency of the switching signal $S_W$ (as shown in FIG. 2). The control signal $I_X$ is coupled to the oscillator 300 (as shown in FIG. 2) to control the frequency of the clock signal CLK for controlling the switching frequency of the switching signal $S_W$. According to above, the modulation circuit (generation circuit 200C and the oscillator 300) modulates the maximum switching frequency of the switching signal $S_W$ in response to the output voltage $V_O$.

FIG. 9 is a circuit diagram of an embodiment of the current source 270B in accordance with the present invention. As shown in FIG. 9, the difference between the current source 270B shown in FIG. 9 and the current source 270A shown in FIG. 4 is that the amplifier 271 of the current source 270B receives the output-voltage signal $E_O$ for generating the current $I_M$. Other circuits of the current source 270B are the same as the current source 270A shown in FIG. 4, so it is not described again.

Figure 10:
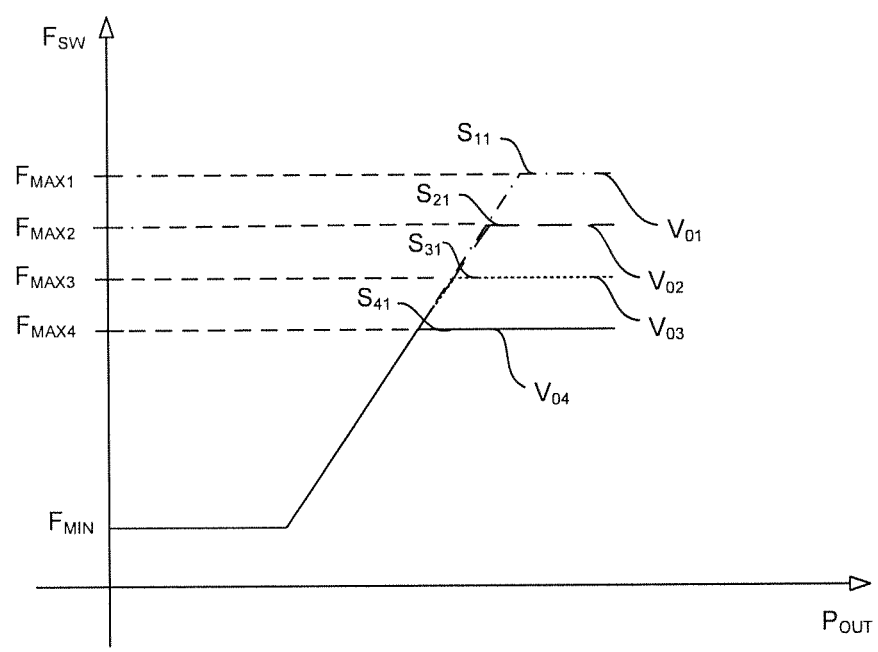
FIG. 10 shows curve of the switching frequency ($F_{SW}$) of the switching signal versus the output power ($P_{OUT}$) of the power supply in accordance with the generation circuit in FIG. 8.

FIG. 10 shows curve of the switching frequency ($F_{SW}$) of the switching signal $S_W$ versus the output power ($P_{OUT}$) of the power supply in accordance with the generation circuit 200C in FIG. 8. The curves $S_{11}$, $S_{21}$, $S_{31}$, and $S_{41}$ show the switching frequency of the switching signal $S_W$ (as shown in FIG. 1) versus the output power ($P_{OUT}$) of the power supply according to different output voltage $V_O$ of the power supply. According to FIG. 8 and FIG. 9, the current $I_M$ is higher when the output voltage $V_O$ is higher, and therefore the maximum value of the control signal $I_X$ is also higher. That is, the maximum switching frequency of the switching signal $S_W$ is higher.

As shown in FIG. 10, when the output voltage $V_O$ is the voltage $V_{O1}$, the maximum switching frequency of the switching signal $S_W$ is $F_{MAX1}$. When the output voltage $V_O$ is the voltage $V_{O2}$, the maximum switching frequency of the switching signal $S_W$ is $F_{MAX2}$, wherein $V_{O1}>V_{O2}>V_{O3}>V_{O4}$ and $F_{MAX1}>F_{MAX2}>F_{MAX3}>F_{MAX4}$. According to above, the maximum switching frequency of the switching signal $S_W$ is increased when the output voltage $V_O$ is increased to be higher. The maximum switching frequency of the switching signal $S_W$ is decreased when the output voltage $V_O$ is decreased to be lower. In other words, the maximum switching frequency of the switching signal $S_W$ is modulated in response to the change of the output voltage $V_O$, that is for stabilizing the system.

Figure 11:
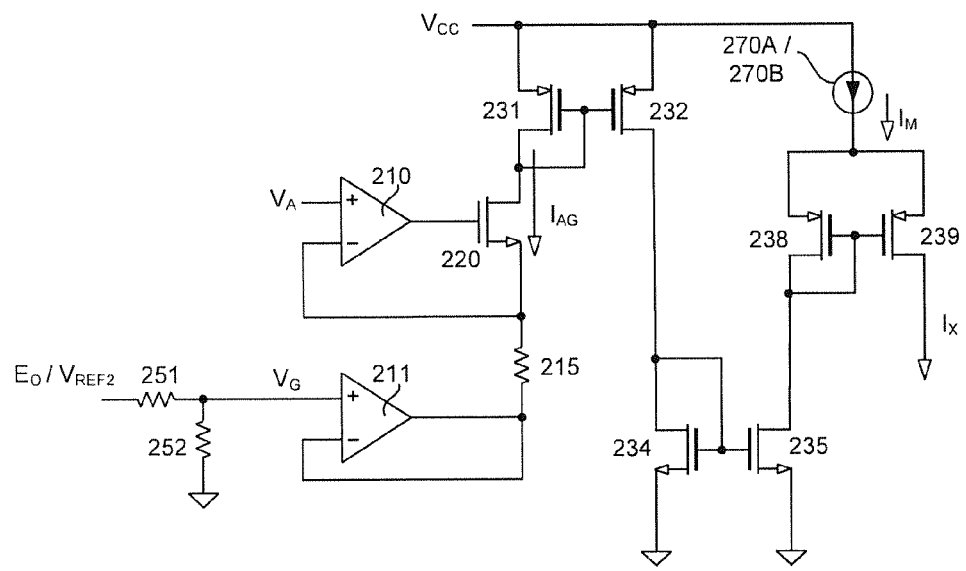
FIG. 11 is a circuit diagram of a fourth embodiment of the generation circuit in accordance with the present invention.

FIG. 11 is a circuit diagram of an embodiment of the generation circuit 200D in accordance with the present invention. As shown in FIG. 11, the voltage divider (resistors 251 and 252) of the generation circuit 200D is coupled to receive the output-voltage signal $E_O$ (output voltage $V_O$) or the reference signal $V_{REF2}$ to generate the signal $V_G$. Further, the current source 270A or 270B is utilized to provide the current $I_M$. Other circuits of the generation circuit 200D are the same as the generation circuit 200B shown in FIG. 3B, so it is not described again.

Figure 12:
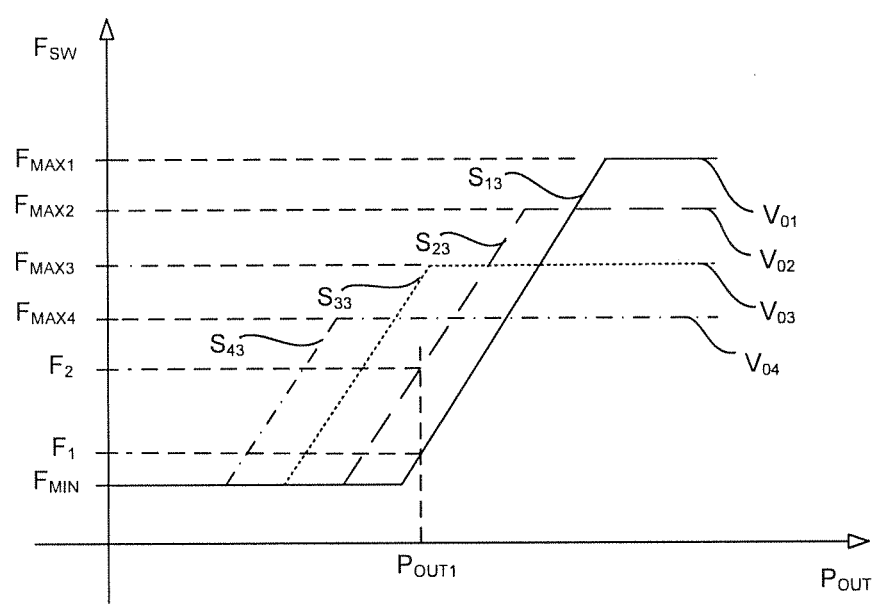
FIG. 12 shows curve of the switching frequency ($F_{SW}$) of the switching signal versus the output power ($P_{OUT}$) of the power supply in accordance with the generation circuit in FIG. 11.

FIG. 12 shows curve of the switching frequency ($F_{SW}$) of the switching signal $S_W$ versus the output power ($P_{OUT}$) of the power supply. The curves $S_{13}$, $S_{23}$, $S_{33}$, and $S_{43}$ show the switching frequency of the switching signal $S_W$ (as shown in FIG. 1) versus the output power ($P_{OUT}$) of the power supply according to different output voltage $V_O$ (as shown in FIG. 1) of the power supply, wherein $V_{O1}>V_{O2}>V_{O3}>V_{O4}$ and $F_{MAX1}>F_{MAX2}>F_{MAX3}>F_{MAX4}$. According to FIG. 11, if the generation circuit 200D receives the output-voltage signal $E_O$ (output voltage $V_O$) for generating the signal $V_G$, and the current source 270B is utilized to provide the current $I_M$, the switching frequency of the switching signal $S_W$ and the maximum switching frequency of the switching signal $S_W$ are modulated according to the change of the output voltage $V_O$.

As shown in FIG. 11, if the output voltage $V_O$ is decreased from the voltage $V_{O1}$ to the voltage $V_{O2}$, the switching frequency of the switching signal $S_W$ is increased from $F_1$ to $F_2$ (if the output power of the power supply is maintained to be $P_{OUT1}$), and the maximum switching frequency of the switching signal $S_W$ is decreased from $F_{MAX1}$ to $F_{MAX2}$.

Figure 13:
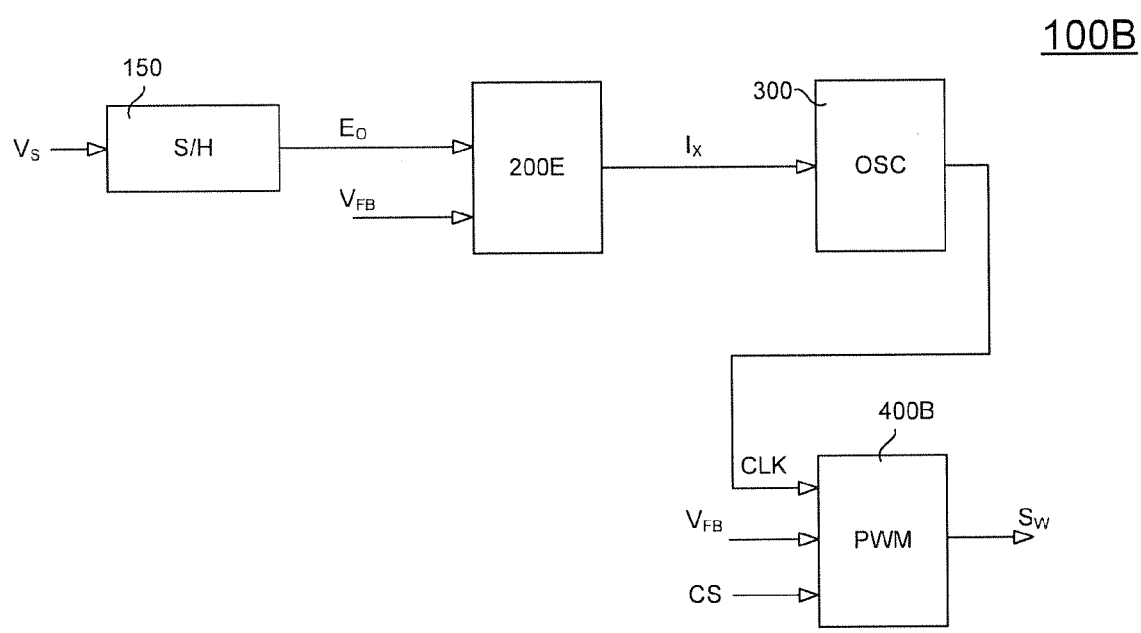
FIG. 13 is a circuit diagram of a second embodiment of the control circuit in accordance with the present invention.

FIG. 13 is a circuit diagram of an embodiment of the control circuit 100B in accordance with the present invention. As shown in FIG. 13, the difference between the control circuit 100B shown in FIG. 13 and the control circuit 100A shown in FIG. 2 is that the control circuit 100B doesn't have the level-shift circuit (the transistor 120 and the resistors 110, 125, 126). A generation circuit 200E of the control circuit 100B is coupled to receive the feedback signal $V_{FB}$ and the output-voltage signal $E_O$ for generating the control signal $I_X$. A PWM circuit (PWM) 400B of the control circuit 100B is coupled to receive the feedback signal $V_{FB}$, the switching current signal CS, and the clock signal CLK for generating the switching signal $S_W$.

Figure 14:
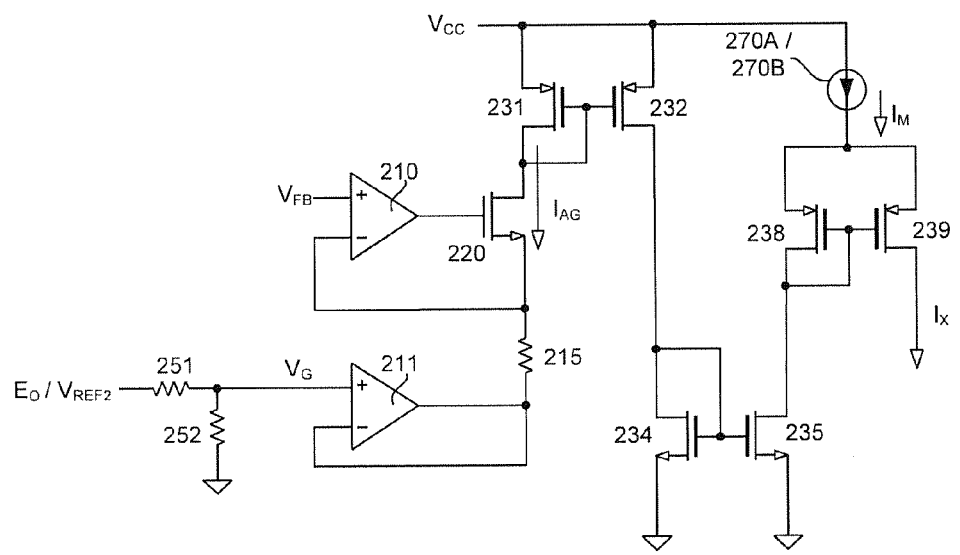
FIG. 14 is a circuit diagram of a fifth embodiment of the generation circuit in accordance with the present invention.

FIG. 14 is a circuit diagram of an embodiment of the generation circuit 200E in accordance with the present invention. As shown in FIG. 14, the difference between the generation circuit 200E shown in FIG. 14 and the generation circuit 200D shown in FIG. 11 is that the positive input terminal of the amplifier 210 of the generation circuit 200E is coupled to receive the feedback signal $V_{FB}$ for generating the control signal $I_X$. Other circuits of the generation circuit 200E are the same as the generation circuit 200D shown in FIG. 11, so it is not described again.

Figure 15:
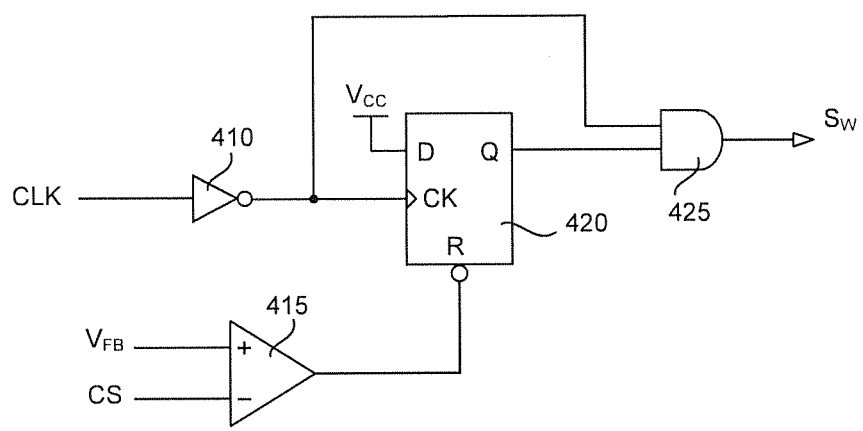
FIG. 15 is a second reference circuit diagram of the PWM circuit in accordance with the present invention.

FIG. 15 is a reference circuit diagram of the PWM circuit 400B in accordance with the present invention. As shown in FIG. 15, the difference between the PWM circuit 400B shown in FIG. 15 and the PWM circuit 400A shown in FIG. 6 is that the positive input terminal of the comparator 415 of the PWM circuit 400B is coupled to receive the feedback signal $V_{FB}$ for resetting the flip-flop 420. Other circuits of the PWM circuit 400B are the same as the PWM circuit 400A shown in FIG. 6, so it is not described again.

Figure 16:
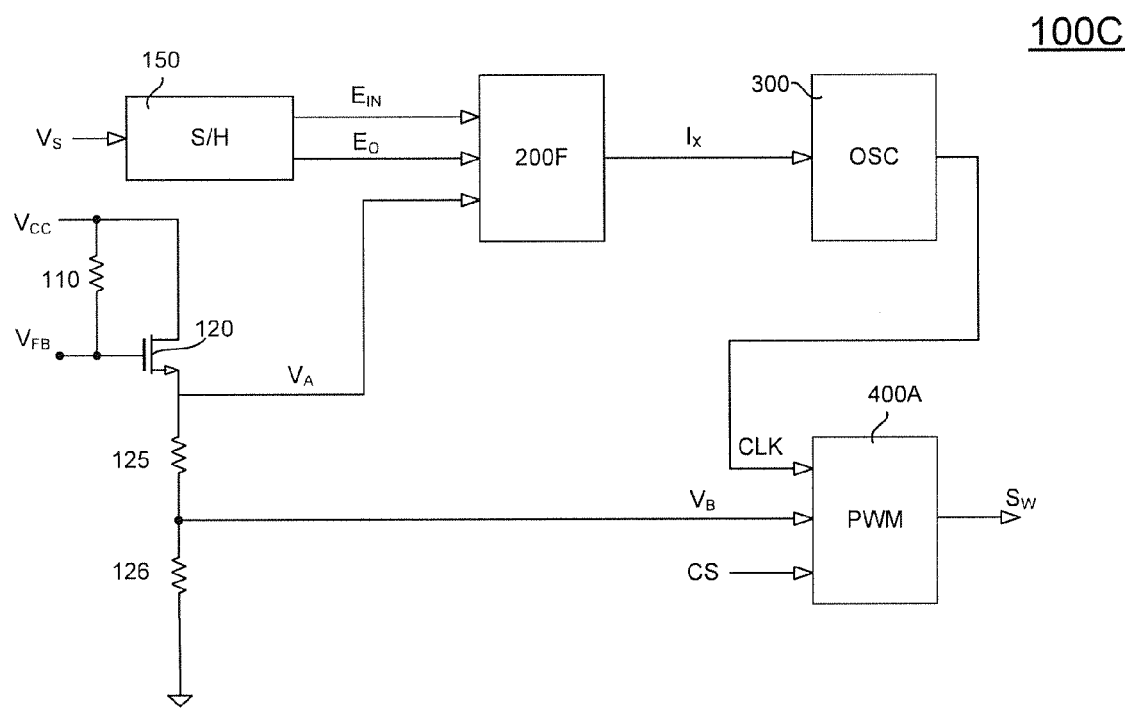
FIG. 16 is a circuit diagram of a third embodiment of the control circuit in accordance with the present invention.

FIG. 16 is a circuit diagram of an embodiment of the control circuit 100C in accordance with the present invention. As shown in FIG. 16, the difference between the control circuit 100C shown in FIG. 16 and the control circuit 100A shown in FIG. 2 is that the sample-hold circuit (S/H) 150 of the control circuit 100C further generates an input-voltage signal $E_{IN}$ in response to the reflected signal $V_S$. The sample-hold circuit 150 is utilized to sample the reflected voltage of the transformer 10 (as shown in FIG. 1) to generate the input-voltage signal $E_{IN}$ and the output-voltage signal $E_O$. The input-voltage signal $E_{IN}$ represents the input voltage $V_{IN}$ (as shown in FIG. 1) of the power supply. A generation circuit 200F is coupled to the sample-hold circuit 150 and the resistor 125 to receive the output-voltage signal $E_O$, the input-voltage signal $E_{IN}$, and the feedback signal $V_A$ for generating the control signal $I_X$. Other circuits of the control circuit 100C are the same as the control circuit 100A shown in FIG. 2, so it is not described again.

The modulation circuit (the generation circuit 200F and the oscillator 300) is utilized to modulate the switching frequency of the switching signal $S_W$ in response to the feedback signal $V_A$, the output-voltage signal $E_O$, and the input-voltage signal $E_{IN}$. In other words, the modulation circuit is utilized to modulate the switching frequency of the switching signal $S_W$ in response to the feedback signal $V_{FB}$, the output voltage $V_O$ (as shown in FIG. 1), and the input voltage $V_{IN}$ of the power supply. The detailed approach for generating the input-voltage signal $E_{IN}$ through the detection of the transformer's voltage can be found in the prior art of "Detection circuit for sensing the input voltage of transformer", U.S. Pat. No. 7,671,578.

Figure 17:
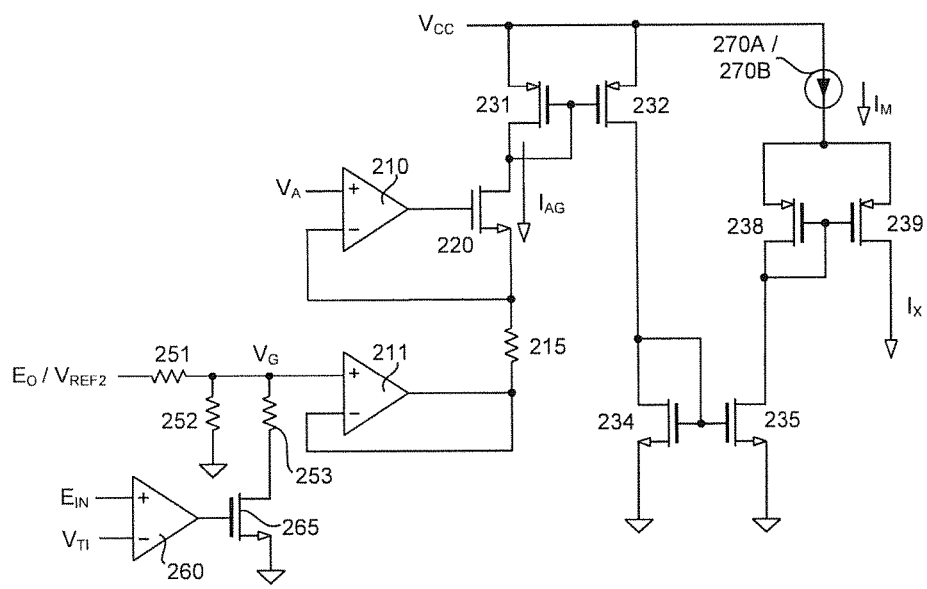
FIG. 17 is a circuit diagram of a sixth embodiment of the generation circuit in accordance with the present invention.

FIG. 17 is a circuit diagram of an embodiment of the generation circuit 200F in accordance with the present invention. As shown in FIG. 17, the difference between the generation circuit 200F shown in FIG. 17 and the generation circuit 200D shown in FIG. 11 is that the generation circuit 200F further comprises a resistor 253, a comparator 260, and a transistor 265. A first terminal of the resistor 253 is coupled to the joint of the resistors 251 and 252. A second terminal of the resistor 253 is coupled to the drain of the transistor 265. The source of the transistor 265 is coupled to the ground. The resistor 253 is utilized to develop the voltage divider with the resistors 251 and 252. A positive input terminal of the comparator 260 is coupled to receive the input-voltage signal $E_{IN}$. A negative input terminal of the comparator 260 is coupled to receive a threshold $V_{T1}$. An output terminal of the comparator 260 is coupled to the gate of the transistor 265.

The conduction/non-conduction of the resistor 253 is controlled by the transistor 265. The comparator 260 will turn on the transistor 265 once the input-voltage signal $E_{IN}$ is higher than the threshold $V_{T1}$. Therefore, when the input-voltage signal $E_{IN}$ is lower than the threshold $V_{T1}$, the transistor 265 is turned off, and the signal $V_G$ is shown as equation (2). When the input-voltage signal $E_{IN}$ is higher than the threshold $V_{T1}$, the transistor 265 is turned on, and the signal $V_G$ can be expressed as, $$V_G = \frac{R_P}{R_{251} + R_P} \times E_O \quad (5)$$

$$R_P = \frac{R_{252} \times R_{253}}{R_{252} + R_{253}} \quad (6)$$

According to above, the generation circuit 200F generates the control signal $I_X$ in response to output-voltage signal $E_O$, the input-voltage signal $E_{IN}$, and the feedback signal $V_A$. That is, the generation circuit 200F generates the control signal $I_X$ in response to output voltage $V_O$, the input voltage $V_{IN}$, and the feedback signal $V_{FB}$ (as shown in FIG. 1). In one embodiment according to the present invention, the resistor 251 is coupled to the reference signal $V_{REF2}$ for generating the signal $V_G$. In another embodiment according to the present invention, the resistor 251 is coupled to the output-voltage signal $E_O$ for generating the signal $V_G$, the current source 270A is utilized to provide the current $I_M$, and the curve of the switching frequency ($F_{SW}$) of the switching signal $S_W$ versus the output power ($P_{OUT}$) of the power supply is shown in FIG. 18.

Figure 18:
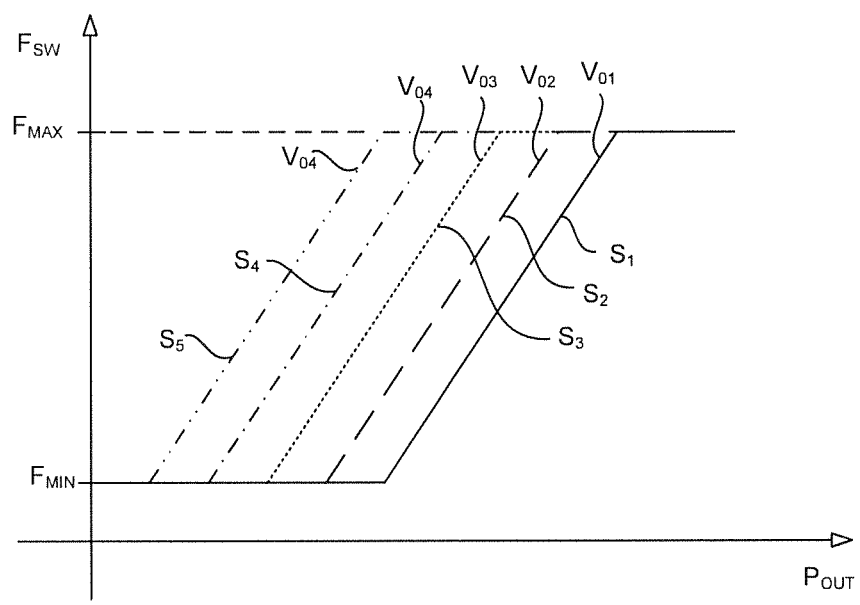
FIG. 18 shows curve of the switching frequency ($F_{SW}$) of the switching signal versus the output power ($P_{OUT}$) of the power supply in accordance with the control circuit in FIG. 16.

FIG. 18 shows curve of the switching frequency ($F_{SW}$) of the switching signal $S_W$ versus the output power ($P_{OUT}$) of the power supply in accordance with the control circuit 100C in FIG. 16. As shown in FIG. 17, once the input-voltage signal $E_{IN}$ is higher than the threshold $V_{T1}$ (the level of the input voltage $V_{IN}$ is higher), the level of the signal $V_G$ is decreased. According to the equations (3) and (4), once the level of the signal $V_G$ is decreased, the level of the current $I_{AG}$ and the level of the control signal $I_X$ are increased. Therefore, the switching frequency of the switching signal $S_W$ is increased in response to the increase of the level of the control signal $I_X$. Further, as shown in the curve $S_5$ in FIG. 18, when the level of the input voltage $V_{IN}$ is higher, the control circuit 100C (as shown in FIG. 16) will start to decrease the switching frequency of the switching signal $S_W$ at the lower level of the output power of the power supply.

Although the present invention and the advantages thereof have been described in detail, it should be understood that various changes, substitutions, and alternations can be made therein without departing from the spirit and scope of the invention as defined by the appended claims. That is, the discussion included in this invention is intended to serve as a basic description. It should be understood that the specific discussion may not explicitly describe all embodiments possible; many alternatives are implicit. The generic nature of the invention may not fully explained and may not explicitly show that how each feature or element can actually be representative of a broader function or of a great variety of alternative or equivalent elements. Again, these are implicitly included in this disclosure. Neither the description nor the terminology is intended to limit the scope of the claims.

What is claimed is:

1. A control circuit of a programmable power supply, comprising:

the control circuit configured to firm a switching signal for switching a transformer and regulating an output of the programmable power supply wherein an output voltage of the programmable power supply is programmable;

a first input configured to receive a feedback signal that is related to a level of an output power of the programmable power supply;

a second input configured to receive a signal that is representative of the output voltage; and a modulation circuit configured to modulate a switching frequency of the switching signal in response to the feedback signal and also in response to the output voltage.

2. The control circuit as claimed in claim 1, wherein the modulation circuit comprises:
a generation circuit generating a control signal in response to the feedback signal and the output voltage; and
an oscillator generating a clock signal according to the control signal; wherein the clock signal is supplied to a PWM circuit, the PWM circuit generates the switching signal in response to the clock signal and the feedback signal, and the switching frequency of the switching signal is determined by the frequency of the clock signal.

3. The control circuit as claimed in claim 2, wherein the control signal is generated in response to an input voltage of the programmable power supply.

4. The control circuit as claimed in claim 1, wherein the modulation circuit modulates the switching frequency of the switching signal in response to the feedback signal, the output voltage and an input voltage of the programmable power supply.

5. The control circuit as claimed in claim 4, further comprising:
a sample-and-hold circuit coupled to the transformer for generating an input-voltage signal; wherein the input-voltage signal represents the input voltage of the programmable power supply, the modulation circuit modulates the switching frequency of the switching signal in response to the input-voltage signal.

6. The control circuit as claimed in claim 4, wherein the control circuit is configured to decrease a level of the output power at which the control circuit starts to decrease the switching frequency wherein the decrease of the level occurs in response to an increase of the input voltage.

7. A control circuit of a programmable power supply, comprising:
the control circuit configured to use a switching signal for switching a transformer and regulating an output of the programmable power supply wherein the output voltage of the programmable power supply is programmable;
a modulation circuit modulating a switching frequency of the switching signal in response to a feedback signal and an output voltage of the programmable power supply wherein the feedback signal is related to the level of an output power of the programmable power supply; and
the control circuit configured to one of decrease a level of output power at which the control circuit starts to decrease the switching frequency wherein the decrease of the level is in response a decrease of the output voltage, or increase the switching frequency in response to a decrease in the output voltage when the output power is substantially maintained, or decrease the output power in response to a decrease in the output voltage when the switching frequency is substantially maintained.

8. A method of modulating a switching frequency for a programmable power supply, comprising:
configuring a control circuit to use a switching signal for switching a transformer and regulating an output of the programmable power supply wherein an output voltage of the programmable power supply is programmable;
configuring the control circuit to modulate a switching frequency of the switching signal in response to a feedback signal and an output voltage of the programmable power supply wherein a level of the feedback signal is related to the level of an output power of the programmable power supply; and
configuring the control circuit to one of reduce a value of the output power at which the control circuit starts decreasing the switching frequency wherein the decrease of the value occurs as the output voltage is reduced, or decrease the switching frequency in response to increases in the output voltage as the output power is substantially maintained, or decrease the output power in response to a decrease in the output voltage as the switching frequency is substantially maintained.

9. The method as claimed in claim 8, further comprising:
generating a control signal in response to the feedback signal and the output voltage;
generating a clock signal according to the control signal; and
generating the switching signal in response to the clock signal and the feedback signal;
wherein the switching frequency of the switching signal is determined by the frequency of the clock signal.

10. The method as claimed in claim 9, wherein the control signal is generated in response to an input voltage of the programmable power supply.

11. The method as claimed in claim 8, comprising:
modulating the switching frequency of the switching signal in response to an input voltage of the programmable power supply.

12. The method as claimed in claim 11, further comprising:
generating an input voltage signal by sampling a voltage of the transformer; wherein the input-voltage signal represents the input voltage of the programmable power supply, the switching frequency of the switching signal is modulated in response to the input-voltage signal.

13. The method as claimed in claim 11, wherein the switching frequency of the switching signal is started to decrease at a lower level of the output power when the input voltage is higher.

14. A control circuit of a programmable power supply, comprising:
the control circuit configured to use a switching signal for switching a transformer and regulating an output of the programmable power supply wherein an output voltage of the programmable power supply is programmable; and
a modulation circuit configured to modulate a maximum switching frequency of a switching signal in response to the output voltage wherein the control circuit one of decreases the maximum switching frequency when the output voltage decreases, or increases the maximum switching frequency when the output voltage increases.

15. The control circuit as claimed in claim 14, wherein the modulation circuit comprises:
a generation circuit configured for generating a control signal, and modulating a maximum value of the control signal in response to the output voltage for modulating the maximum switching frequency of the switching signal; and
an oscillator configured for generating a clock signal according to the control signal; wherein the clock signal is supplied to a PWM circuit, the PWM circuit generates the switching signal in response to the clock signal, the switching frequency of the switching signal is determined by the frequency of the clock signal, and a maximum frequency of the clock signal is determined by the maximum value of the control signal.

16. The control circuit as claimed in claim 15, wherein the control signal is generated in response to a feedback signal, the output voltage and an input voltage of the programmable power supply, the level of the feedback signal is related to the level of an output power of the programmable power supply.

17. The control circuit as claimed in claim 14, wherein the modulation circuit modulates the switching frequency of the switching signal in response to a feedback signal, the output voltage, and an input voltage of the programmable power supply, the level of the feedback signal is related to the level of an output power of the programmable power supply.

18. The control circuit as claimed in claim 17, wherein the control circuit will start to decrease the switching frequency of the switching signal at a lower level of the output power when the input voltage is higher.

19. The control circuit as claimed in claim 17, wherein the control circuit will start to decrease the switching frequency of the switching signal at a lower level of the output power when the output voltage is lower.

20. The control circuit as claimed in claim 17, wherein the control circuit will increase the switching frequency of the switching signal when the output voltage is decreased and the output power of the programmable power supply is maintained.

21. The control circuit as claimed in claim 17, wherein the output power is decreased when the output voltage is decreased and the control circuit maintains the switching frequency of the switching signal.

22. A method of forming a maximum switching frequency for a programmable power supply, comprising:
    configuring a control circuit to form a switching signal for switching a transformer and regulating an output voltage of the programmable power supply; and
    configuring the control circuit to modulate a maximum switching frequency of the switching signal in response to the output voltage including configuring the control circuit to one of decrease the maximum switching frequency in response to a decrease in the output voltage or to increase the switching frequency in response to an increase in the output voltage.

23. The method as claimed in claim 22, further comprising:
    configuring the control circuit to modulate a switching frequency of the switching signal in response to a feedback signal, the output voltage, and an input voltage of the programmable power supply, in which the level of the feedback signal is related to the level of an output power of the programmable power supply.

24. The method as claimed in claim 23, wherein the switching frequency of the switching signal is started to decrease at a lower level of the output power when the input voltage is higher.

25. The method as claimed in claim 23, wherein the switching frequency of the switching signal is started to decrease at a lower level of the output power when the output voltage is lower.

26. The method as claimed in claim 23, wherein the switching frequency of the switching signal is increased when the output voltage is decreased and the output power of the programmable power supply is maintained.

27. The method as claimed in claim 23, wherein the output power is decreased when the output voltage is decreased and the switching frequency of the switching signal is maintained.

28. The control circuit of claim 1 wherein the modulation circuit configured to modulate the switching frequency of the switching signal in response to the feedback signal and also in response to the output voltage includes the modulation circuit configured to modulate the switching frequency in response to the feedback signal and also in response to the signal that is representative of the output voltage.

* * * * *